Figures 1, 2:
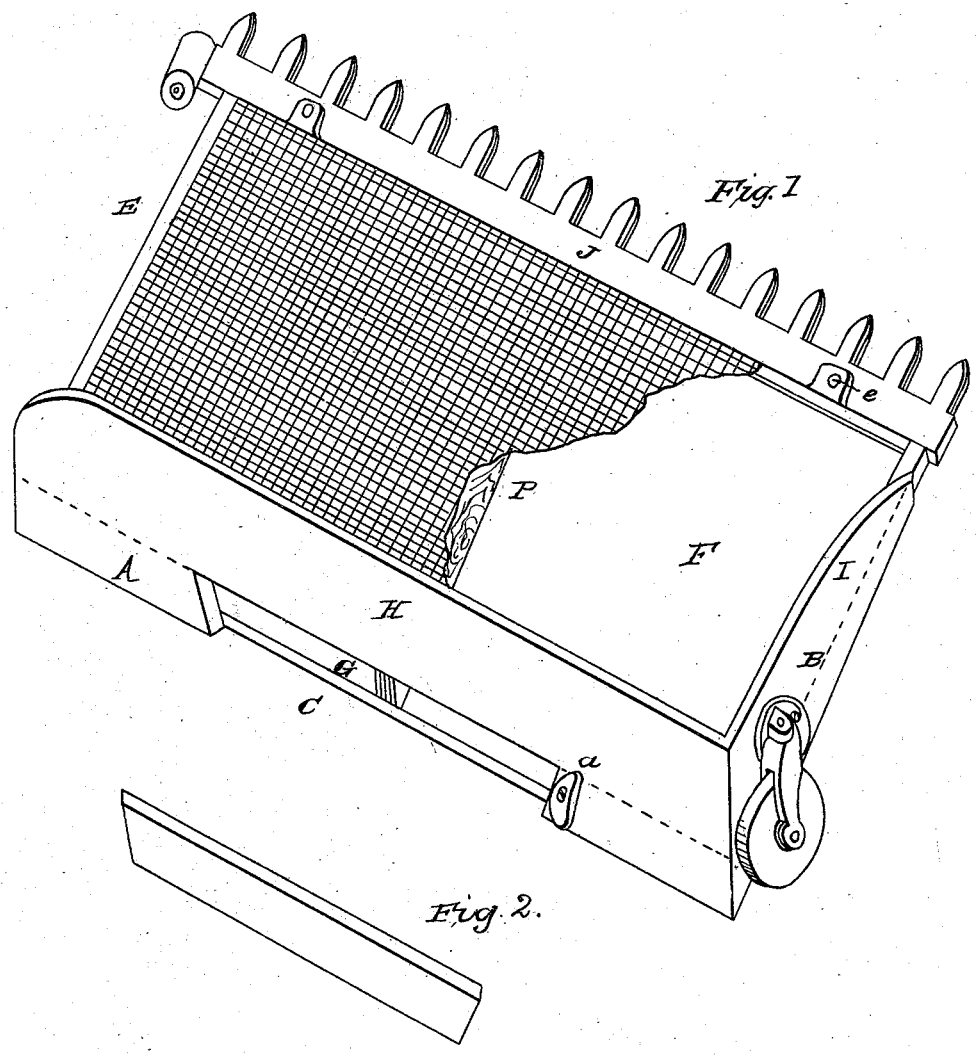

A. E. GLEASON.
Grain Platform for Harvesters.

No. 75,674.    Patented March 17, 1868

Witnesses
Hulbert G. Fowler.
Edwin H. Johnson.

Inventor
Asa E. Gleason

UNITED STATES PATENT OFFICE.

ASA E. GLEASON, OF NEWTON, MICHIGAN.

IMPROVEMENT IN GRAIN-PLATFORMS FOR HARVESTERS.

Specification forming part of Letters Patent No. 75,674, dated March 17, 1868; antedated March 9, 1868.

*To all whom it may concern:*

Be it known that I, ASA E. GLEASON, of Newton, in the county of Calhoun and State of Michigan, have invented a new and useful Improvement in Platforms to Reaping and Mowing-Machines, for saving the seed of clover or other grass shed while being mown; and I do hereby declare that the following is a full, clear, and exact description of the construction and operation of the same, reference being had to the annexed drawings, forming a part of this specification, in which—

Figure 1 is a perspective view of the platform. Fig. 2 exhibits the door detached.

My invention consists in connecting to any mowing-machine a box-platform, constructed with a shallow tapering frame, one side and one end of which are respectively indicated at A and B under the broken lines. A tight board bottom, C, is attached to the under side of the frame aforesaid, and the top consists of wire-sieve cloth E, stretched over and fastened to its upper sides or edges. A portion of this cloth is exhibited as torn away next a partition, (to be hereinafter described,) for the purpose of showing the interior compartment F.

As my object in using such a platform as described is to save over-ripe seed (shed during cutting) from waste by permitting it to fall through small openings into tight compartments below, it is evident that substantially the same results would follow if the top were of perforated sheet metal, or composed of parallel wires, like a screen, arranged in the path of the rake; and I will say here that, whatever the upper perforated or slotted platform may be, it is essential that it be so arranged and secured as to present no obstruction to the free passage of the rake, operated either automatically or by hand.

As such a platform is necessarily of large area, I frame in one or more partitions, as at P, so as to divide the interior into two or more compartments, an opening, as at G, being cut through the deep or hind end of the frame opposite each partition, through which opening the collected seed can be raked from the two adjoining compartments into a bag. The openings may be closed by doors, as at D, fitted with beveled joints and secured by turn-buckles *a*, or hinged and secured in any other convenient way.

When my platform is used with a mower and reaper, it takes the place of the ordinary reaper-platform, and is, of course, connected to the machine in a similar manner; but when used with a simple mower unprovided with a regular platform, I generally bolt the front or shallow end to the finger-bar J through ear-straps *e*, which allow a little play, to permit the hinder end to follow the undulations of the ground, which end is supported by a caster-wheel, *w*; but the front end may be jointed to the bar, if deemed necessary.

H and I represent the ordinary ledge-boards partially surrounding the platform.

Although I have hitherto treated of my perforated box-platform as only applicable to the saving of clover and grass seed, yet, under certain conditions, it may be measurably useful in saving over-ripe grain. But, as its utility is mainly dependent upon the condition of the crop when cut, it may be expedient to provide a plain sheet-iron or board platform to secure over the sieves or screens when there is no tendency to shedding, and so use it in every respect as a common board platform, thus saving the wear of the wire-cloth, and obviating the necessity of having two separate platforms and appurtenances to one machine.

Trailing platforms of sheet-iron are frequently used in connection with mowers; but it is solely for the purpose of depositing in heaps, to avoid the labor of raking over the whole ground, and any loose seed of clover, &c., would, of course, be raked off with the heads; whereas, in my improved platform, the ripe seed or grain falls, as it is detached from the heads in cutting, through the perforations or interstices between the wires, and is deposited in the box below, the raking off materially aiding the operation.

What I claim as my invention, and desire to secure by Letters Patent, is—

A reaping or mowing machine platform having perforations or interstices, in connection and combination with box-compartments F, provided with openings and doors G and D, the whole constructed, attached, and supported substantially as and for the purpose herein specified.

ASA E. GLEASON.

Witnesses:
HYLBERT J. FOWLER,
EDWIN H. JOHNSON.